United States Patent [19]
Fournet

[11] 3,961,726
[45] June 8, 1976

[54] PRESSURIZATION AND DISPENSING DEVICE FOR A LIQUID MONOPROPELLANT IN A CONTAINER

[75] Inventor: Maurice Pierre Joseph Fournet, Meudon, France

[73] Assignee: Centre National d'Etudes Spatiales, Paris, France

[22] Filed: Aug. 22, 1975

[21] Appl. No.: 607,053

[30] Foreign Application Priority Data
Aug. 26, 1974 France .............................. 74.29141

[52] U.S. Cl. ................................................ 222/3
[51] Int. Cl.² ............................................ B67B 7/24
[58] Field of Search ................. 222/3, 4, 5, 146 HE, 222/331

[56] References Cited
UNITED STATES PATENTS
996,969  7/1911  Buckman, Jr. ............................ 222/3
2,304,488  12/1942  Tucker ................................. 222/3

*Primary Examiner*—Allen N. Knowles
*Assistant Examiner*—Hadd Lane
*Attorney, Agent, or Firm*—A. W. Breiner

[57] ABSTRACT

A reservoir for a liquid monopropellent such as hydrazine for use in, for example, a satellite contains a plurality of partitions so arranged that gas and liquid zones are defined by capillary action or surface tension effects. Controlled decomposition of the liquid phase is effected by means of a heating device to maintain a substantially constant pressure for the gas phase. The heating device is supplied with electrical pulses whenever the pressure falls below the required value.

11 Claims, 2 Drawing Figures

U.S. Patent  June 8, 1976  3,961,726
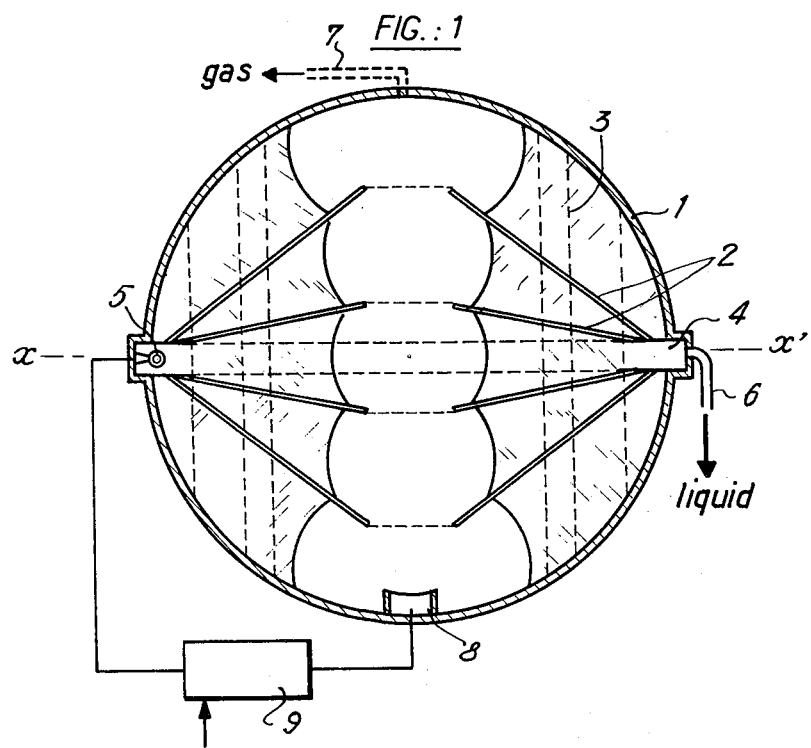
FIG.: 1
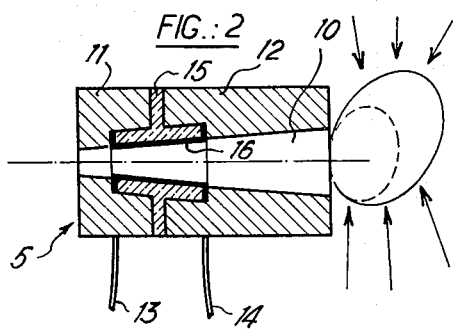
FIG.: 2

PRESSURIZATION AND DISPENSING DEVICE FOR A LIQUID MONOPROPELLANT IN A CONTAINER

This invention relates generally to means for the propulsion or orientation of an object, for example, an earth satellite or any other similar vehicle, and is more specifically concerned with the pressurisation of a fluid monopropellant such as hydrazine in a satellite for delivery to the satellite propulsion system.

The invention is specifically concerned with the use of a liquid monopropellent, i.e. of a liquid propellent which is capable of supplying, by appropriate transformation and without the addition of another component, a gaseous decomposition product which can be used for pressurisation.

Artificial satellites whose positions are established according to three coordinate axes, for example, those which are characterised by very low speeds of rotation in space, are subject to a particular difficulty relating to the continuity of supply of propellent to their propulsion systems in order to regulate their attitude and position. Generally, the reservoirs are under considerable pressure of the order of several bars to, for example, thirty bars. This pressurisation has the effect of causing the liquid contained in the reservoir to flow to the circuits in which it will be utilised. But it is clear that this increased pressure is incapable in itself of ensuring continuity of supply of the propellent unless there is also provided in the reservoir means for separating, in the absence of gravity, the liquid phase and the gaseous phase, the latter phase being constituted essentially by the pressurisation gas.

Thus, it has been recognised that the obvious and natural idea of arranging a wall of a deformable material between the phases in order to effect separation thereof comes up against practical difficulties. This is why, in the present invention, a system of multiple partitioning has been used which is certainly preferable and which is based on a "capillary retention" or surface tension effect.

Implementation of the invention, therefore, requires, for one part at least, the arrangement inside the reservoir of a series of partitions which may or may not be perforated. These partitions, as well as the inner surface of the reservoir itself, establish at their points of intersection with the surfaces of separation of the liquid and gaseous phases a system of capillary or surface tension forces the total effect of which is to confine the liquid phase in a predetermined zone of the reservoir. This zone communicates with the orifices through which the liquid is expelled from the reservoir. The forces brought into play are sufficient to obtain the desired separation effect when the reservoir is in conditions of absolute weightlessness or subjected to very low acceleration conditions. These forces remain, however, insufficient to expel the liquid effectively to the circuits in which it will be utilised. Expulsion, as has already been said, is achieved in fact by the pressure exerted by the gaseous phase. In addition, the invention provides means for controlling the transformation of the liquid monopropellent into gaseous monopropellent and means for controlling the discharge of the monopropellent from the reservoir.

One might ask whether it would not be simpler and easier to introduce initially an inert compressed gas into the reservoir, in order to obtain the required pressurisation of the monopropellent. In fact this course of action would present several disadvantages which will be enumerated:

a. the pressure within the reservoir decreases gradually with expulsion of the liquid. For effective and reliable operation of the devices which use the liquid (shut-off valves and reaction motors) it is necessary that the relationship between the actuating pressure at the beginning and the actuating pressure at the end of a space flight should not exceed a certain value. When for example the value 3 is adopted, one is stating:

1. that the functioning of the devices operated by the liquid varies a predetermined amount in that time, and
2. that a third of the useful volume of the reservoir is initially occupied by the gas and not by the liquid.

b. because the pressure at the end of the process of supply of liquid has to be above a certain pressure, the initial pressure which is three times higher, is very large. As a result, the thickness of the reservoir casing and hence the mass of the reservoir is high in relation to the mass of the contained liquid.

It will be noted that the "dead" volume, of a third in the example selected, is responsible in two ways for the increase in mass:

on the one hand, the reservoir, must be of greater volume than is strictly necessary and this will, for a given thickness, increase the mass when empty by about 20%, and on the other hand, the increase in the dimensions of the reservoir necessitates an increase in the thickness, and this will cause a second increase in the mass when empty of about 30%, c. the high operating pressures have the effect of complicating substantially the problems of ensuring fluid-tightness and the technology of the shut-off valve sealing systems.

d. the very high value of the initial pressure, coupled with the explosive nature of the propellents, constitutes a considerable constraint, especially for safety, during the assembly and completion of the satellite and the preparatory phases of the launching process. Thus, the use of an inert compressed gas has been abandoned.

According to the invention, a reservoir for a liquid monopropellent includes means controlling the thermal conversion of the liquid monopropellent, into the gaseous phase, a plurality of partitions within the reservoir which are arranged to confine the liquid monopropellent in a preselected zone of the reservoir by capillary retention or surface tension effects and to define a complementary zone of the reservoir in which the gaseous phase is formed under pressure as a result of thermal treatment of the liquid monopropellent, and means for discharging the liquid monopropellent or the gaseous phase or both separately or simultaneously from the reservoir.

When using hydrazine as the monopropellent, a local increase in the temperature of a solid surface in contact with the hydrazine above 500°C. the following exothermic reaction:

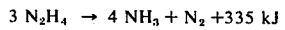

$$3 N_2H_4 \rightarrow 4 NH_3 + N_2 + 335 \text{ kJ}$$

Provided that conversion of the monopropellent is effected by means of thermal impulses of limited thermal energy and provided that the thermal conductance of the heating element with an adjacent cold mass is sufficient, the heat supplied by the reaction is rapidly diffused within the body of the liquid and within the cold mass so that the decomposition reaction stops as soon as the impulse of thermal energy is terminated.

Thus, a bubble of gas is formed at each impulse. Means are provided in accordance with a further feature of the invention to avoid the bubble thus formed from "becoming caught" by capillary action, probably around the heating element, and from interfering with operation of the heating element during the course of the following impulse. Said means may depend, in particular, on the particular geometry of the "heating device".

In addition, according to another feature of the invention, the reservoir may be provided with a manometric collector together with means for controlling the frequency of the electrical impulses applied to the heating element by means of an electronic converter and thereby to maintain the pressure in the reservoir at a preselected value. It is accordingly possible to establish an increase in pressure in the reservoir only at the desired moment, for example, by means of a programmer and this will occur at the end of the propelled phases of the launching of the satellite into orbit.

The invention will now be described by way of example with reference to one embodiment which is illustrated in the accompanying drawings, in which:

FIG. 1 shows a reservoir for a satellite and

FIG. 2 illustrates a heating device for inclusion in the reservoir.

The reservoir shown in FIG. 1 is formed as a container 1 of spherical or generally spheroidal shape designed to operate in conditions of weightlessness. The reservoir contains a plurality of partitions 2, of generally frusto-conical form, said partitions being disposed around or adjacent the equatorial plane $x-x'$ of the reservoir. The angles between adjacent partitions 2 and between the partitions and the wall of the reservoir are such that the system of partitioning thus obtained gives rise to surface tension or capillary forces at the interfaces of the gas-liquid phases which tend to repel the liquid towards the equatorial zone. The partitions 2 are perforated by small holes, not shown, which provide communication between the compartments of the partitioning system. An alternative system of partitioning could be formed by coaxial cylindrical partitions 3 (shown in dotted lines in FIG. 1) extending at right angles to the plane $x-x'$.

From FIG. 1 it can be seen that a gaseous phase is established at the centre of the reservoir (the situation shown in this particular figure corresponds to a situation in which approximately a quarter of the liquid has been discharged from the reservoir) and the remainder of the reservoir is still occupied by the liquid phase. The surfaces of the liquid in contact with the gas have a concave shape because of the forces of capillarity i.e. the surface tension forces. A peripheral delivery channel 4 extends around the whole of the equatorial zone of the reservoir and this channel contains a heating device 5 which is used to decompose the liquid, i.e. hydrazine. This heating device is in contact with the hydrazine and, in fact, is situated at the position which will be occupied by the last droplets of liquid present in the reservoir, at the end of the delivery process. At another point in the channel 4 there has been placed a withdrawal pipe 6 for the delivery of the liquid monopropellant, which is subjected to the pressure of the gaseous phase; this pipe goes, for example, to shut-off valve (not shown) controlling operation of a propulsion device. A withdrawal pipe 7 for the gas can also be provided at a point in communication with the gaseous phase, (towards the top in FIG. 1). This gas can be used in various ways in the satellite, for example, for very small corrections in attitude or in trajectory of the satellite, or for pneumatic actuation of equipment on board the satellite. One or the other of pipes 6 and 7, or both can be used for withdrawal. A manometric collector 8 is connected to an electronic control unit 9 for controlling the heating device. The unit 9 comprises a comparator and an impulse generator; the comparator receives an electrical signal supplied by the collector 8, compares it to a pre-selected reference value and, when the signal goes below this value, initiates operation of the impulse generator at a selected frequency, the impulses being discharged within the heating device 5 (possibly after amplification).

FIG. 2 shows a possible structure of the heating device which comprises a cylindrical block provided with a frusto-conical cavity 10. The block is actually formed from two coaxial parts 11, 12, connected respectively to connections 13, 14 forming the two terminals of the heating device. The two parts 11, 12 are separated by an insulating material 15 such as beryllium oxide and are electrically connected by a resistance layer 16, carried by the insulating material 15 and which ensures electrical communication between the parts 11, 12.

As the liquid monopropellent fills the frusto-conical cavity 10 the pulse of heat released by the heating resistance 16 causes the formation of a bubble within the cavity, the bubble initially facing the resistance. Because of the frusto-conical shape of the cavity, the bubble is displaced towards the right in FIG. 2. It has been shown at the outlet end of the cavity in this figure, at first in dotted lines; then it becomes enlarged (the shape thereof being shown in continuous lines) while being contained by the pressure of the liquid (shown by the arrows). The bubble is then detached and is directed towards the centre of the reservoir where it joins the gaseous phase. It will be noted that the heat-sink formed by the heating device itself allows the reaction to be stopped at the end of the electrical impulse.

Of course, alternative embodiments are possible without departing from the scope of the invention. For example, instead of partitions 2 or 3 as shown, the reservoir might be at least partially filled by means of a metallic foam of non-uniform porosity. In the heating device, the resistance element may cover either the whole of the inner frusto-conical surface or a portion limited by generating lines.

Be that as it may, the advantages of the device according to the invention, in relation to the classic solutions are specifically as follows:

a. the pressure of supply is constant, so that operation of motors or other operated devices does not change during the mission, and this considerably simplifies the design of the whole of the stabilisation system, b. the pressure is reduced and the volume is completely filled by liquid monopropellant at departure so that the mass of the casing is considerably reduced. Theoretically, it can be 4 to 5 times lower than in the conventional solution (with the pressure changing from 30 to 10 bars), c. the complete filling of the reservoir obviates the problems of liquid displacement which affect the posture of certain components and stabilisation of the satellite during launching and during the phase of positioning it in orbit, d. the reduction in pressure reduces to a certain extent the problems of fluid-tightness which frequently affect certain systems, especially the valve gear, e. the procedure for initial pressurising of the reservoir is abolished as are all the risks inherent in prolonged maintainance thereof based on launching a reservoir under high pressure filled with a dangerous liquid.

As has been said, there are various possibilities for the application of the device according to the invention besides that which has been described above for satellites. For example, it could be used to supply the reactors of an aerial appliance or a turboreactor in a vehicle.

What is claimed is:

1. A reservoir for a liquid monopropellant such as hydrazine, which reservoir is intended to be full of liquid monopropellant at the beginning of its period of operation, said reservoir being provided with means controlling the thermal transformation of the liquid monopropellant into a gaseous phase, a plurality of partitions within the reservoir which are arranged to confine the liquid monopropellant in a preselected zone of the reservoir by capillary or surface tension effects and to define a complementary zone of the reservoir where the gaseous phase is formed under pressure as a result of thermal treatment of the liquid monopropellant, and means for discharging the liquid monopropellant or the gaseous phase or both from the reservoir.

2. A reservoir according to claim 1, in which the means controlling the thermal transformation of the liquid monopropellant is an electric heating device which is supplied, in use, with electrical recurrent pulses and is disposed in contact with the liquid monopropellant.

3. A reservoir according to claim 2, including a manometric collector and an electronic unit for controlling the supply of pulses to the heating device, pulses being supplied when the pressure in the reservoir falls below a reference value and continuing until the pressure reaches said value.

4. A reservoir according to claim 2, wherein the heating device is situated at the position occupied by the last liquid droplets present in the reservoir at the end of the discharge process.

5. A reservoir according to claim 2, wherein the heating device is formed by two metallic blocks separated by an electrically insulating material covered by an electrical resistance layer which connects the two blocks electrically, said layer being connected to the two poles of an electrical energy source and the blocks being formed with a frusto-conical cavity.

6. A reservoir according to claim 1, wherein the means for discharging the liquid propellant comprises a withdrawal pipe which opens into the reservoir within the liquid phase zone.

7. A reservoir according to claim 1, wherein the means for discharging the gaseous phase comprises a withdrawal pipe which opens into the reservoir within the gaseous phase zone.

8. A reservoir according to claim 1, wherein the discharge means includes two withdrawal pipes which open into the reservoir, one at a position within the gaseous phase zone, the other at a position within the liquid phase zone.

9. A reservoir according to claim 1 which is of spherical form or comprises a surface of revolution, wherein the partitions comprise perforated frusto-conical walls which are joined together at least substantially in an equatorial or median region in which a peripheral discharge channel is situated.

10. A reservoir according to claim 1, wherein the plurality of partitions comprises a series of coaxial, cylindrical partitions perpendicular to an equatorial or median region of the reservoir, which is of spherical shape or comprises a surface of revolution.

11. A reservoir according to claim 1, wherein the plurality of partitions is formed by at least partially filling the reservoir with a metallic foam of non-uniform porosity.

* * * * *